(12) United States Patent
Waltman

(10) Patent No.: US 7,909,683 B1
(45) Date of Patent: Mar. 22, 2011

(54) KNIFE AND METHOD OF USING SAME

(76) Inventor: Jason Craig Waltman, Gulf Breeze, FL (US)

( * ) Notice: Subject to any disclaimer, the term of this patent is extended or adjusted under 35 U.S.C. 154(b) by 0 days.

(21) Appl. No.: 12/882,932

(22) Filed: Sep. 15, 2010

(51) Int. Cl.
*A22C 18/00* (2006.01)

(52) U.S. Cl. ........................................................ 452/149

(58) Field of Classification Search .................. 452/2–5, 452/137; 30/102–105, 277.4, 272.1, 228, 30/123, 142, 147–149, 340, 535, 296.1, 392–394, 30/369, 383.3, 279.2, 173, 182, 299, 298.4; D7/642, 645, 649–652
See application file for complete search history.

(56) References Cited

U.S. PATENT DOCUMENTS

| 1,847,062 A | * | 2/1932 | Lemmon, Jr. ...................... 30/304 |
| 2,142,197 A | * | 1/1939 | Lee ................................ 452/137 |
| 2,830,368 A | * | 4/1958 | Knoll et al. ................... 30/277.4 |
| 3,270,368 A | * | 9/1966 | Cook, Sr. et al. .............. 452/105 |
| 4,592,140 A | * | 6/1986 | Chasen ......................... 30/123.7 |
| 7,677,960 B2 | * | 3/2010 | Van Vleet ...................... 452/102 |

* cited by examiner

*Primary Examiner* — Thomas Price
(74) *Attorney, Agent, or Firm* — Sturm & Fix LLP

(57) ABSTRACT

A knife for producing a butterfly cut of meat, the knife having a handle and a first knife blade attached at one end thereof to the handle, the first knife blade having a first distance between the top and the bottom thereof and being sharpened on the bottom thereof. A second knife blade is operatively attached at one end thereof to the handle, the second knife blade having a fixed position disposed generally parallel to the first knife blade, the second knife blade having being sharpened on the bottom thereof, the bottom of the second knife blade being disposed above and at a predetermined distance to one side of the bottom of the first knife blade over a major portion of the first and second knife blades when the second blade is attached to the handle in the fixed position thereof.

10 Claims, 5 Drawing Sheets

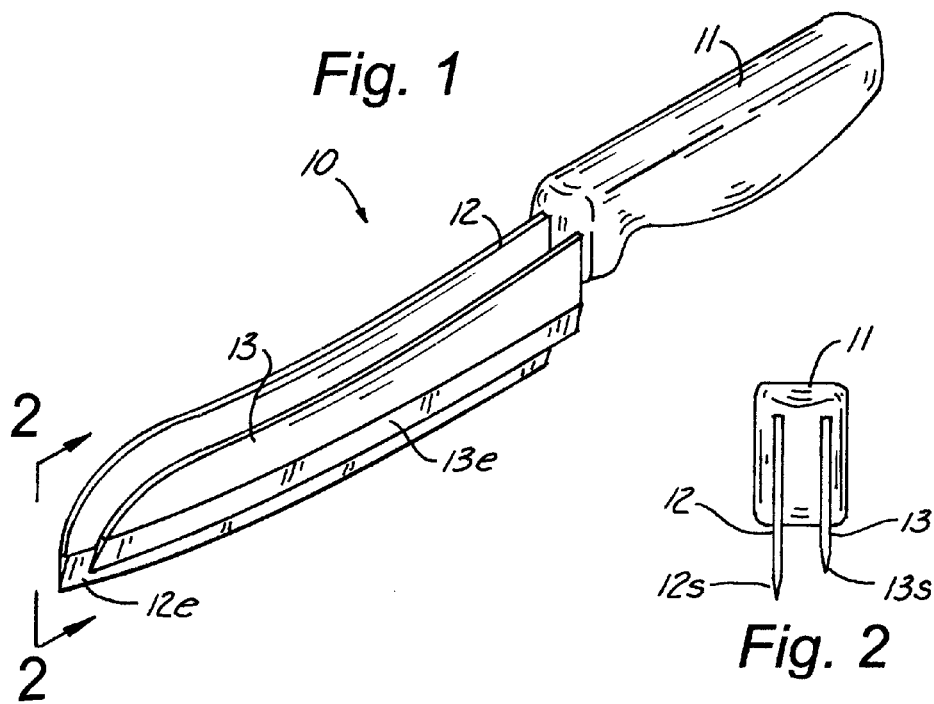
Fig. 1
Fig. 2
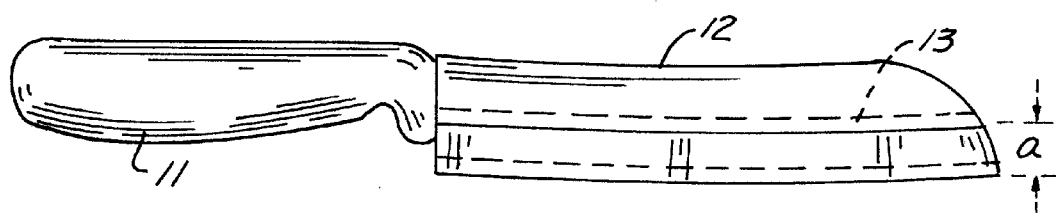
Fig. 3
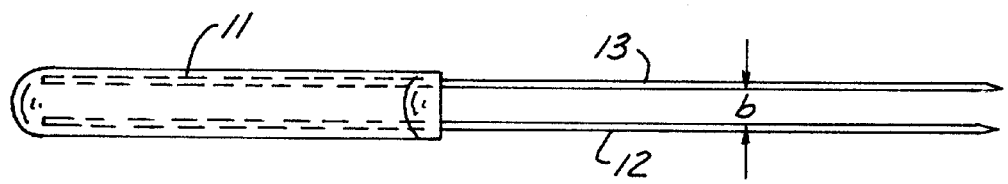
Fig. 4

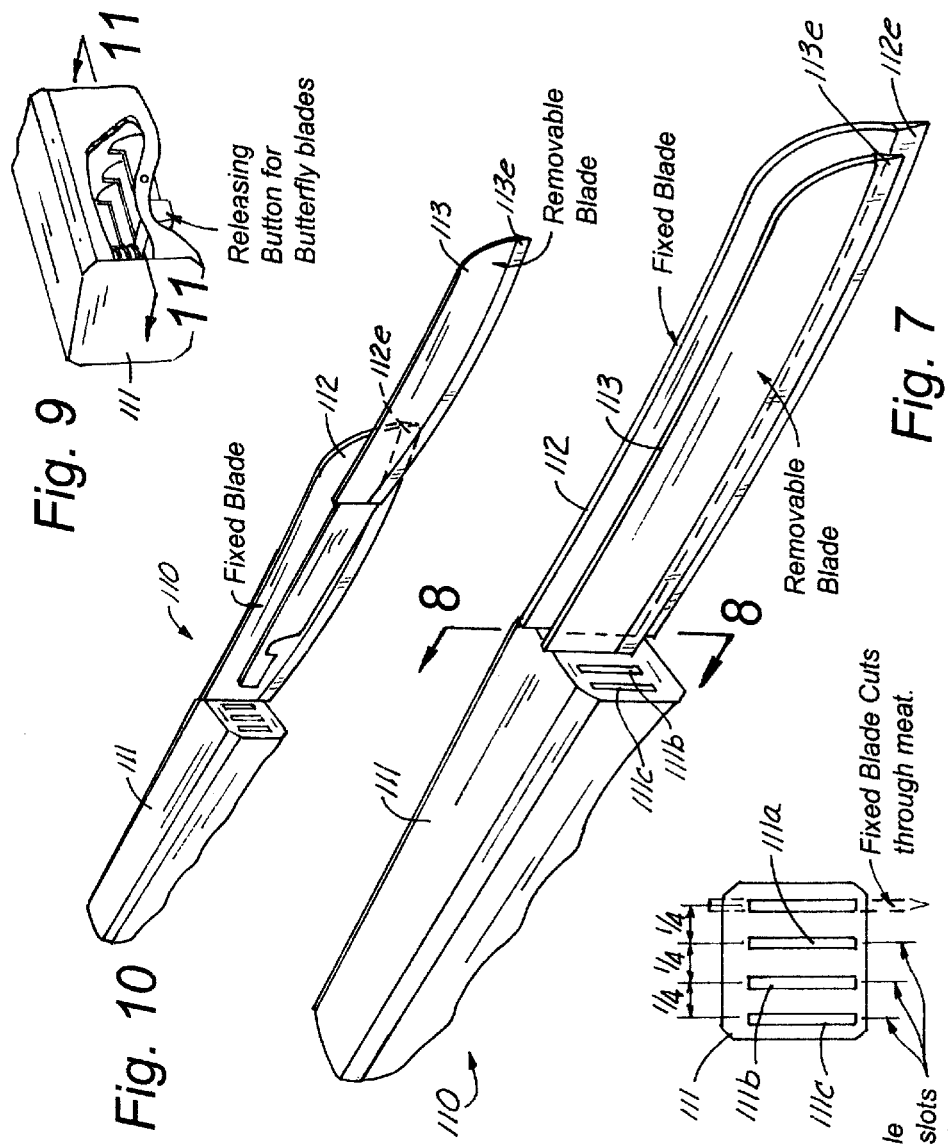

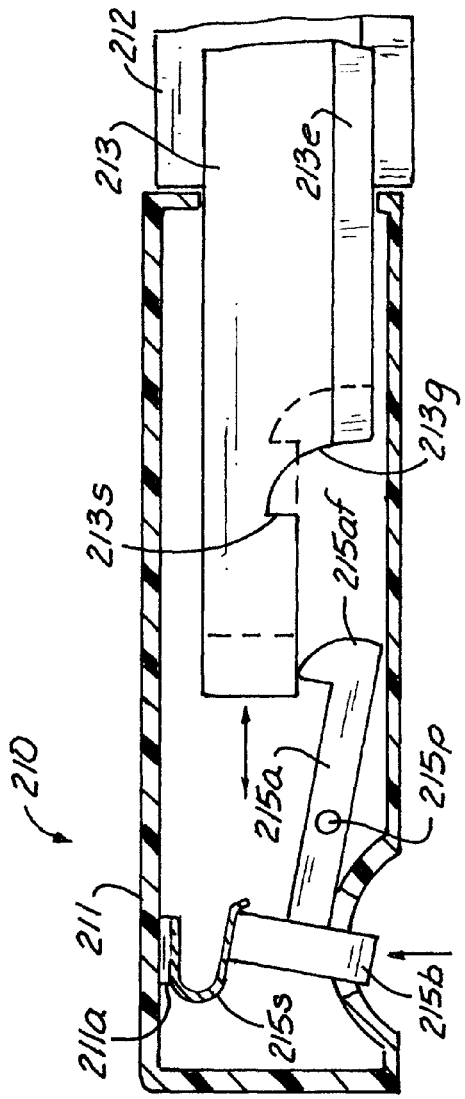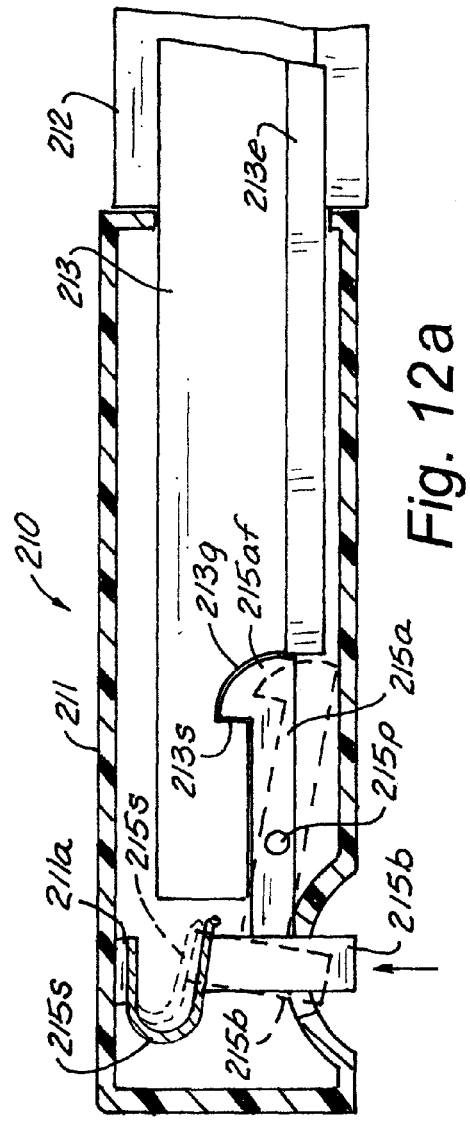

KNIFE AND METHOD OF USING SAME

BACKGROUND OF THE INVENTION

1. Field of the Invention

The present invention relates generally to knives and more particularly to a knife for producing a "butterfly" cuts of meat such as a "butterfly chop".

2. Background Art

Knives have been used for centuries for cutting meat. One cut of meat called a "butterfly" cut is made by taking a slice of meat, such as a thick pork or beef tenderloin and cutting it like one would cut a bun for use to hold a hamburger, but not cutting the slice of meat all the way through. For example, if the piece of meat is two inches thick, then one might cut it through leaving one inch on the top and bottom and then cutting to within one inch of having cut it into two pieces. After that, one would fold it open and end up with one "butterfly" piece that is essentially one inch thick throughout its entire thickness. These cuts can be cooked flat, or stuffing can be added and the piece of "butterfly" meat can be refolded essentially to the configuration it had before it was cut into the "butterfly" shape, but have the stuffing between the two halves of the meat.

While this above mentioned, tried and true, technique works well for butchers and people with a lot of experience in the butterfly meat process, it is not so easy or efficient for amateurs who have never made a butterfly cut of meat. And even for those who have lots of experience in making butterfly cuts of meat, the process can be time consuming and tiring if a large quantity of cuts of meat are to be processed in this way.

Accordingly there is a need for ways to solve the aforementioned problems.

BRIEF SUMMARY OF THE INVENTION

The present invention relates to a method and apparatus for making butterfly cuts of meat of a type including a handle, a first knife blade operatively attached at one end thereof to the handle, the first knife blade having a top, a bottom, a first side, a second side, a first distance between the top and the bottom thereof and being sharpened on the bottom thereof, the first knife blade being fixed to one position with respect to the handle. A second knife blade is operatively attached at one end thereof to the handle, the second knife blade having a fixed position disposed generally parallel to the first knife blade, the second knife blade also having a top, bottom and a first side, a second side and being sharpened on the bottom thereof. The bottom of the second knife blade is disposed above and at a predetermined distance to one side of the bottom of the first knife blade over a major portion of the first and second knife blades when the second blade is attached to the handle in the fixed position thereof.

The method of using this butterfly knife apparatus involves placing a piece of meat on a cutting surface, the meat having a first end, a second end a top and a bottom, hovering or placing the second blade over the top of the piece of meat to one side of the first end of the piece of meat by approximately the predetermined distance between the first and second knife blades and the first knife blade by a distance of approximately twice the predetermined distance from said one end of the piece of meat and then causing the first and second knife blades to move downwardly to cut the piece of meat to an extent wherein the first knife blade cuts the meat completely to the cutting surface. Simultaneously with that cutting by the first knife blade, the second knife blade cuts the meat between the first knife blade and the first end of the piece of by only a predetermined amount that is less than cutting the meat all the way to the cutting surface, whereby a butterfly cut of meat is produced.

BRIEF DESCRIPTION OF THE SEVERAL VIEWS OF THE DRAWINGS

FIG. 1 is a perspective view of a preferred embodiment of a butterfly knife constructed in accordance with the present invention;

FIG. 2 is an end view taken along line 2-2 of FIG. 1;

FIG. 3 is a side elevational view of the knife of FIG. 1 looking from the front of the knife shown in FIG. 1;

FIG. 4 is a top view of the knife of FIG. 1;

FIG. 7 is a perspective view of a second preferred embodiment of a butterfly knife constructed in accordance with the present invention where the distance between the blades is adjustable;

FIG. 8 is a view taken along line 8-8 of FIG. 7 with the second blade removed and the first blade in dashed lines;

FIG. 9 is a perspective view of a portion of the handle of the second preferred embodiment of a butterfly knife partially broken away to show a mechanism for changing and locking the position of the second blade;

FIG. 10 is a partial perspective view of the knife, showing the second blade in readiness to be inserted into one of the slots in the handle;

FIG. 12 is a cross sectional view of a third preferred embodiment similar to FIG. 11 but showing in dashed lines the second blade being pushed into a slot in the handle that would hit against a curved portion of the lock to pivot the lock and in solid lines how continued forcing of the second blade to the left as shown in FIG. 12 causes the lock to move out of the way so the second blade can move to the FIG. 12a solid line position and hold the second blade securely in place; and FIG. 12a is a cross sectional view of a third preferred embodiment showing the blade locked in position in solid lines and the lock being pushed to the unlocked position in dashed lines.

DETAILED DESCRIPTION OF THE INVENTION

Figures 5, 6:
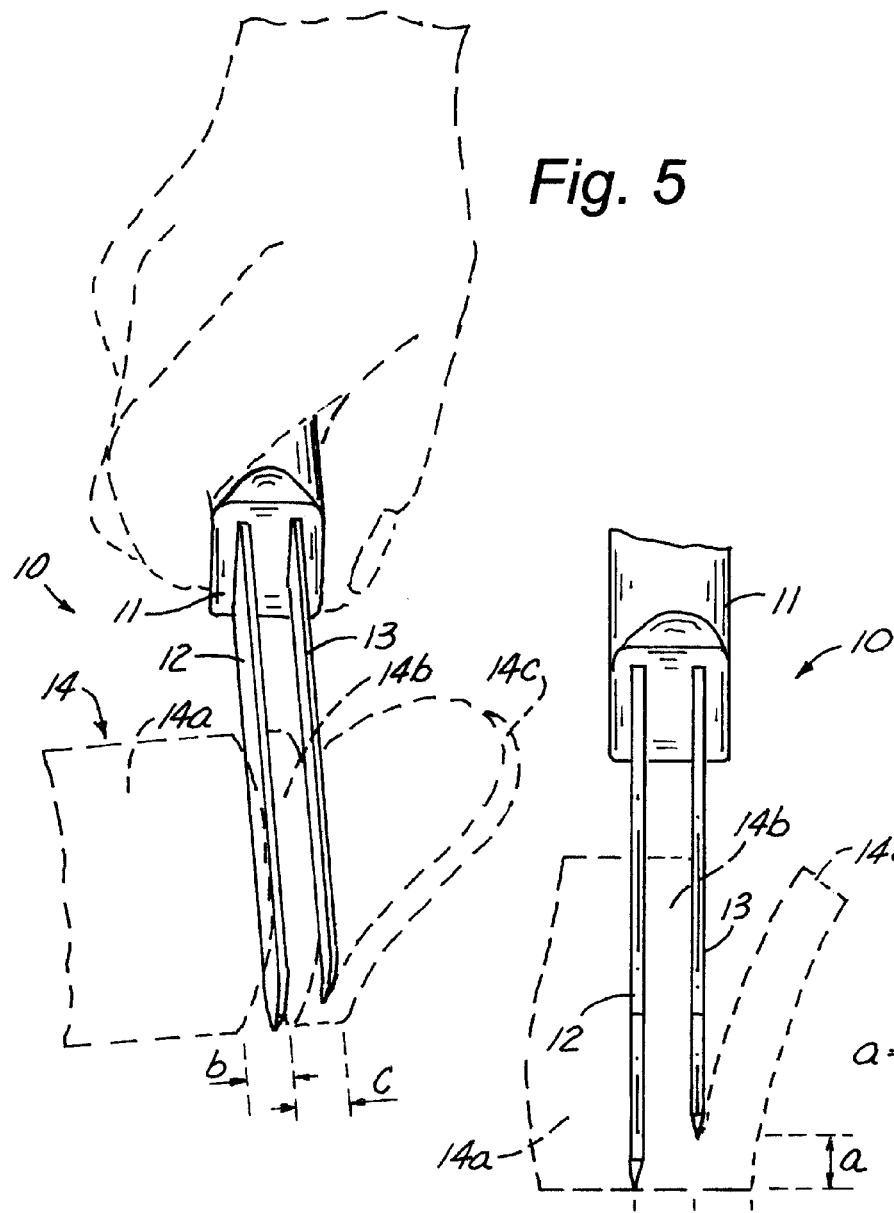
FIG. 5 is a perspective view showing how the preferred embodiment of FIGS. 1-4 is used to cut a piece of meat into a butterfly cut.
FIG. 6 is a top view of the cut being made in FIG. 5.

Referring now to the drawings, wherein like reference numerals designate identical or corresponding parts throughout the several views, FIG. 1 shows the present invention in a preferred embodiment 10, including a handle 11 with a first blade 12 permanently affixed to the handle 11 and a second blade 13 permanently affixed to the handle 11. The first blade 12 has a sharpened lower edge 12e and the second blade has a sharpened lower edge 13e.

Looking to FIGS. 2 and 3 it can be seen that the lower part of the sharpened lower edge 13e of the second blade 13 is spaced a distance "a" above the sharpened lower edge 12e of the first blade 12.

Looking to FIGS. 2 and 4 it can be seen that the second blade 13 is spaced from the first blade 12 is a distance "b". While not drawn to scale in these figures, it is preferred, but not required, that the distance "a" be approximately the same as distance "b" for reasons given below.

Looking now to FIGS. 5 and 6, a method of using the preferred embodiment of a butterfly knife 10 is shown. In FIG. 5, a piece of meat, such as a pork or beef loin 14 is shown being cut by the butterfly knife 10. "Meat" is used herein in a generic sense, which would include substances such as fish, e.g. tuna. The preferred method of use is that the blade edge 12e of blade 12 would be placed on the top of the loin 14 at a distance of approximately twice the distance "b" (distance 2b). So at that time the lower edge 13e of the second blade 13 would be spaced slightly above the top of the loin 14. Then the user would begin to cut the loin 14 as shown in FIGS. 5 and 6 until the lower sharpened blade edge 12e of blade 12 has cut completely through the loin as shown in FIG. 6. Ideally the distances "a", "b" and "c" are approximately the same so that when the meat parts 14b and 14c are folded open, one piece of meat of approximately the same thickness has been produced, though the present invention is not limited to that specific arrangement. Once meat parts 14b and 14c are separated from meat part 14a, the result is a one piece butterfly cut consisting of meat parts 14b and 14c. This procedure of using butterfly knife 10 can be continued with what is left of meat part 14a until meat part 14a has all been cut up into several butterfly cuts of meat.

Looking now to FIGS. 7-11, a second embodiment of the present invention is shown. Knife 110 has a handle 111 with a fixed blade 112, though blade 112 could be made to be removable like second blade 113 as will be explained below. The first blade 112, has a sharpened lower edge 112e and the second blade 113 has a lower sharpened edge 113e. The second blade 113 can be locked into or removed from any one of the slots 111a, 111b, or 111c shown in FIGS. 7 and 8.

Figure 11A:
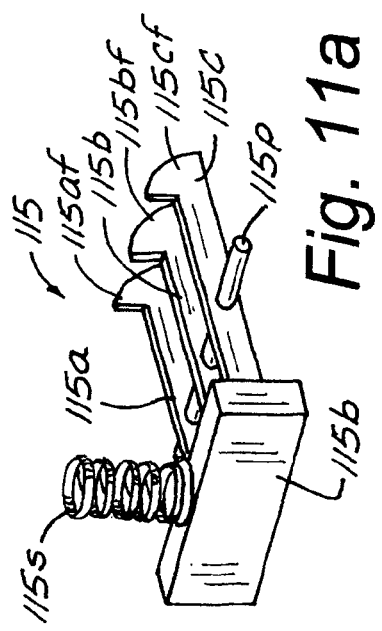
FIG. 11a is a perspective view of the locking/unlocking mechanism shown in FIG. 11.
Figure 11:
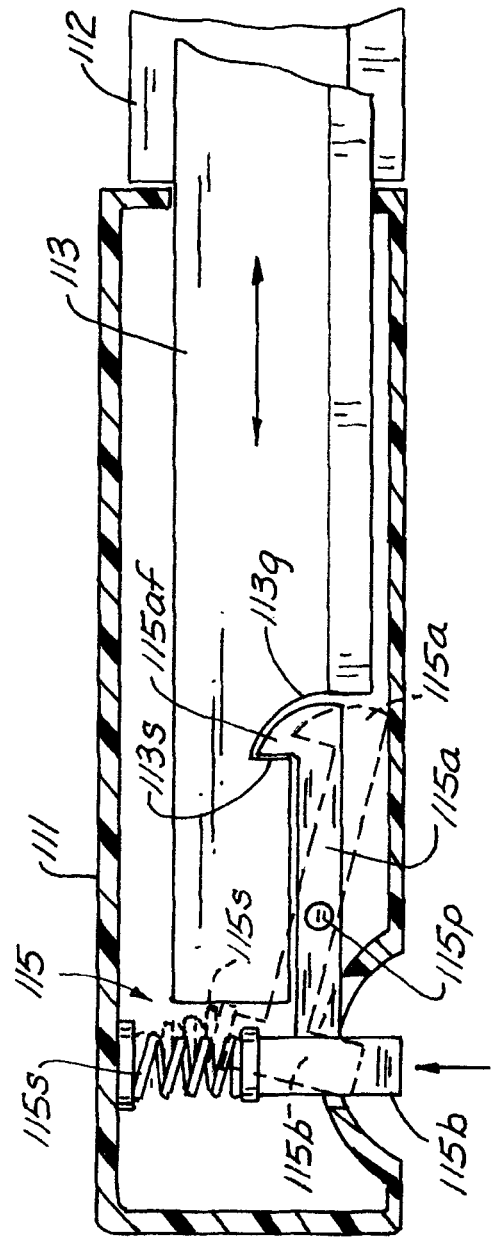
FIG. 11 is a cross sectional view of the second preferred embodiment of a butterfly knife taken along lines 11-11 of FIG. 9, showing the second blade being locked in place in solid lines and in dashed lines is shown an unlocking button being pushed so as to pivot a lock out of a position locking the second blade in place so it can be removed for cleaning or repositioning.

A locking device 115 is shown in FIGS. 9-11 for selectively locking or releasing blade 113 in any one of the slots 111a, 111b or 111c. The locking device 115 has a button base member 115b with a helical compression spring 115s extending upwardly therefrom. Three spaced apart locking members 115a, 115b and 115c are rigidly attached to the button base member 115b. A pivot shaft 115p extends through each of the three spaced apart locking members 115a, 115b and 115c and extends into the handle 111 so that the locking device 115 can be moved from the locked position shown in FIG. 10 in solid lines to the unlocked position shown in dashed lines in FIG. 10.

Looking to FIGS. 9 and 10 again, the spaced apart locking members 115a, 115b and 115c are essentially identical and each has an upwardly extending flange 115af, 115bf and 115cf. Flange 115af on locking member 115a is shown in FIG. 10 extending into groove 113g in blade 113, with the straight edge of flange member 115af being in abutment with the blade surface 113s of blade 113 in solid lines, locking the blade 113 into the handle 111. Blade 113 can be released by pushing the button 115b towards the handle 111 as shown in dashed lines in FIG. 10 to release the blade 113 and allow it to be washed and/or placed into and locked into one of the other slots 111b or 111c on handle 111. More or fewer slots like slots 111a, 111b and 111c can be formed in the handle 111 as desired.

Once the knife 110 is in the configuration desired, for example such as shown in FIG. 7, then the procedure of using it is identical to that shown in FIGS. 5 and 6 of the first embodiment butterfly knife 10 as explained above.

A third preferred embodiment 210 is shown in FIGS. 12 and 12a. This adjustable butterfly knife 210 works just like butterfly knife 110 shown in FIGS. 7-11, except that instead of using a helical spring 115s, a spring steel spring 215s is used. There would be spaced apart locking members 215a, 215b and 215c (only 215a being shown) which would be essentially identical and each has an upwardly extending flange 215af, 215bf and 215cf, though only flange 215af is shown. Flange 215af on locking member 215a is shown in FIG. 12a in solid lines extending into groove 213g in blade 213, with the straight edge of flange member 215af being in abutment with the blade surface 213s of blade 213 in solid lines, locking the blade 213 into the handle 211. Blade 213 can be released by pushing the button 215b towards the handle 211 as shown in dashed lines in FIG. 12a to release the blade 213 and allow it to be washed and/or placed into and locked into one of the other slots on handle 211 like slots 111b or 111c as shown in FIG. 8. The handle 211 can be identical to handle 111, the only difference being the spring steel locking member 215s instead of the helical spring 115s. The spring steel locking member 215s can be attached to the inside of the handle 211 by an double backed adhesive strip 211a to give just one of many options, or it does not necessarily need to be attached to the handle 211 to work so long as it is held in the handle so it can operate as shown in FIGS. 12 and 12a.

Once the knife 210 is in the configuration desired, for example such as shown in FIG. 12 in solid lines, then the procedure of using it is identical to that shown in FIGS. 5 and 6 of the first embodiment butterfly knife 10 as explained above. Furthermore, one can easily adjust the distance between the first blade 212 and the second blade 213 of the knife 210 or remove the blade 213 for cleaning in the manner explained above.

Obviously many modifications and variations of the present invention are possible in light of the above teachings. It is, therefore, to be understood that within the scope of the appended claims, the invention may be practiced otherwise than as specifically described.

The invention claimed is:

1. Apparatus comprising:
   a handle;
   a first knife blade operatively attached at one end thereof to the handle, the first knife blade having a top, a bottom, a first side, a second side, a first distance between the top and the bottom thereof and being sharpened on the bottom thereof, the first knife blade being permanently fixed to one position with respect to the handle;
   a second knife blade operatively attached at one end thereof to the handle, the second knife blade having a fixed position disposed generally parallel to the first knife blade, the second knife blade having a top, bottom and a first side, a second side and being sharpened on the bottom thereof, the bottom of the second knife blade being disposed above and at a predetermined distance to one side of the bottom of the first knife blade over a major portion of the first and second knife blades when the second blade is attached to the handle in the fixed position thereof; and
   wherein the second knife blade has a second fixed position with respect to the handle wherein the predetermined distance is adjustable.

2. Apparatus comprising:
   a handle;
   a first knife blade operatively attached at one end thereof to the handle, the first knife blade having a top, a bottom, a first side, a second side, a first distance between the top and the bottom thereof and being sharpened on the bottom thereof, the first knife blade being permanently fixed to one position with respect to the handle;

a second knife blade operatively attached at one end thereof to the handle, the second knife blade having a fixed position disposed generally parallel to the first knife blade, the second knife blade having a top, bottom and a first side, a second side and being sharpened on the bottom thereof, the bottom of the second knife blade being disposed above and at a predetermined distance to one side of the bottom of the first knife blade over a major portion of the first and second knife blades when the second blade is attached to the handle in the fixed position thereof; and wherein the second blade has a first and a second fixed position thereof with respect to the first blade and wherein the predetermined distance of the second knife blade with respect to the first knife blade in the second fixed position is greater than the predetermined distance between the first and second knife blades in the first position of the second knife blade.

3. The apparatus of claim 2 wherein the handle has a first slot for receiving the second knife blade in the first fixed position thereof and a second slot for receiving the second knife blade in the second fixed position thereof.

4. The apparatus of claim 3 comprising a lock operatively attached to the handle, the lock having a first position for locking the second blade in the first position thereof and a second position for permitting the second blade to be removed from the first slot in the handle.

5. The apparatus of claim 4 wherein the lock is biased to the first locking position thereof.

6. The apparatus of claim 5 including a button operatively attached to the handle and to the lock for moving the lock to the second position thereof, thereby unlocking the second knife blade with respect to the handle.

7. The apparatus of claim 1 wherein the second knife blade has a third position fixed position with respect to the handle.

8. A method of producing a butterfly cut of meat using an apparatus comprising:

a handle;

a first knife blade operatively attached at one end thereof to the handle, the first knife blade having a top, a bottom, a first side, a second side, a first distance between the top and the bottom thereof and being sharpened on the bottom thereof, the first knife blade being fixed to one position with respect to the handle; and a second knife blade operatively attached at one end thereof to the handle, the second knife blade having a fixed position disposed generally parallel to the first knife blade, the second knife blade having a top, bottom and a first side, a second side and being sharpened on the bottom thereof, the bottom of the second knife blade being disposed above and at a predetermined distance to one side of the bottom of the first knife blade over a major portion of the first and second knife blades when the second blade is attached to the handle in the fixed position thereof; said method comprising:

a) placing a piece of meat on a cutting surface, the meat having a first end, a second end a top and a bottom;

b) placing the second blade over the top of the piece of meat to one side of the first end of the piece of meat by approximately the predetermined distance between the first and second knife blades and the first knife blade by a distance of approximately twice the predetermined distance from said one end of the piece of meat;

c) causing the first and second knife blades to move downwardly to cut the piece of meat to an extent wherein the first knife blade cuts the meat completely to the cutting surface and the second knife blade cuts the meat between the first knife blade and the first end of the piece of by only a predetermined amount that is less than cutting the meat all the way to the cutting surface, whereby a butterfly cut of meat is produced.

9. The method of claim 8 wherein the second blade has a first and a second fixed position thereof with respect to the first blade and wherein the predetermined distance of the second knife blade with respect to the first knife blade in the second fixed position is greater than the predetermined distance between the first and second knife blades in the first position of the second knife blade; said method further comprising:

moving the second knife blade to the second fixed position thereof and repeating the process of steps a-c of claim 8.

10. The method of claim 8 wherein the predetermined distance between the first and second knife blades is approximately the same as the predetermined amount of meat that is uncut between the cutting surface and a bottom of the cut made by the second knife blade so that if the butterfly cut of meat is folded open it will be approximately the same thickness throughout.

* * * * *